United States Patent [19]
Yanagawa et al.

[11] Patent Number: 6,049,369
[45] Date of Patent: Apr. 11, 2000

[54] PARALLEL-FIELD TFT LCD HAVING REFERENCE ELECTRODES AND A CONDUCTIVE LAYER

[75] Inventors: Kazuhiko Yanagawa; Masuyuki Ohta; Kazuhiro Ogawa; Keiichiro Ashizawa, all of Mobara, Japan

[73] Assignee: Hitachi, Ltd., Tokyo, Japan

[21] Appl. No.: 08/708,812

[22] Filed: Sep. 9, 1996

[30] Foreign Application Priority Data

Sep. 11, 1995 [JP] Japan .................................. 7-232683
Sep. 12, 1995 [JP] Japan .................................. 7-233587

[51] Int. Cl.⁷ ............................. G02F 1/123; G02F 1/136
[52] U.S. Cl. ............................. 349/141; 349/139; 349/44
[58] Field of Search ............................. 349/141, 44, 110, 349/139, 54

[56] References Cited

U.S. PATENT DOCUMENTS

| | | | |
|---|---|---|---|
| 4,807,973 | 2/1989 | Kawasaki | 349/139 |
| 5,473,452 | 12/1995 | Shin | 349/42 |
| 5,600,460 | 2/1997 | Yanamoto et al. | 349/139 |
| 5,648,826 | 7/1997 | Song et al. | 349/139 |
| 5,684,547 | 11/1997 | Park et al. | 349/42 |
| 5,760,856 | 6/1998 | Yanagawa et al. | 349/110 |
| 5,760,857 | 6/1998 | Yanagawa et al. | 349/43 |
| 5,831,707 | 11/1998 | Ota et al. | 349/141 |

FOREIGN PATENT DOCUMENTS 2-64594  3/1990  Japan .

Primary Examiner—William L. Sikes
Assistant Examiner—Toan Ton
Attorney, Agent, or Firm—Antonelli, Terry, Stout & Kraus, LLP

[57] ABSTRACT

A in-plane switching type liquid crystal display device includes a liquid crystal layer and two transparent substrates with the liquid crystal layer therebetween. Pixel regions are disposed on the surfaces of the transparent substrates on the liquid crystal side, each of the pixel regions including a display electrode and reference electrodes. Voltages are applied to the electrodes to form an electric field in the liquid crystal layer to be parallel to the transparent substrates, thereby modulating light passing through the liquid crystal layer. The display electrodes are configured to receive a video signal from a video signal line. A method of restoring the liquid crystal display device includes the steps of detecting occurrence of an electric linkage between the video signal line and the reference electrodes adjacent thereto and disconnecting, according to a result of the decision, the reference electrodes at a position of occurrence of the electric linkage, the reference electrodes being disconnected in a region on the side of the reference signal line, thereby restoring the position of electric linkage. The liquid crystal display device is configured such that the reference signal lines of the pixel region are electrically connected to those of the pixel region adjacent thereto through other than the reference signal to which the pixel regions are commonly connected.

3 Claims, 18 Drawing Sheets

PARALLEL-FIELD TFT LCD HAVING REFERENCE ELECTRODES AND A CONDUCTIVE LAYER

BACKGROUND OF THE INVENTION

The present invention relates to a liquid crystal display device and a method of manufacturing the same, and in particular, to a liquid crystal display device and a method of manufacturing the same using a so-called in-plane switching method.

In a color liquid crystal display device employing the in-plane switching method, there are disposed two transparent substrates on both surface sides of a liquid crystal layer such that a display electrode and reference electrodes are arranged in a surface region corresponding to a pixel unit of the liquid crystal on either one of the transparent substrates. Light passing through the liquid crystal layer is modulated according to an electric field generated between the display electrode and the reference electrodes in parallel to the transparent substrate surfaces.

Provision of such color liquid crystal display substrates in the display device leads to an advantage that an image presented on the display can be clearly recognized by the viewer in a wide angle of visual field with respect to the display screen. Therefore, it has been well known that the display device using these substrates can be advantageously utilized to obtain a wide angle of visual field.

In a system in which the in-plane switching method is applied to a liquid crystal display device of a so-called active matrix configuration, a switching element is arranged in each of the pixel regions arranged in a matrix shape. When a scan signal is fed from a scan signal line, a switching element is activated in response thereto such that a video signal is supplied from a video signal line to the display electrode. In addition, a reference signal is supplied from a reference signal line to the reference electrodes.

The liquid crystal display device of this construction using the in-plane switching method has been described in detail, for example, in PCT WO91/10936 published Jul. 25, 1991 (Japanese Patent Publication Kohyo-5-505247) and JP-B-63-21907.

However, in the liquid crystal display device using the construction above, it is necessary to arrange the video signal lines to intersect the scan and reference signal lines. Furthermore, since the reference electrodes are disposed on both sides of the display electrode in each pixel domain, the device has a geometrically complex structure.

Therefore, in the manufacturing process of the liquid crystal display device, since there is unavoidably increased the chance of an electric short-circuit or linkage between the respective signal lines and/or between the signal lines and electrodes, which are to be inherently insulated from each other, a simple method of correcting the electric linkage has been desired.

Moreover, when compared with the conventional liquid crystal display device the liquid crystal display device using in-plane switching method additionally requires a reference signal line to supply a reference signal to the reference electrodes of each pixel. It has been reported that the probability of occurrence of an electric linkage is increased between the reference signal line and the video signal line intersecting each other with an insulation film arranged between the reference and video signal lines.

Additionally, since the reference signal line is fabricated as a common region to the pixels arranged in the y-axis direction, when an electric short-circuit occurs between a portion of the reference signal region and the video signal line, a display defect or failure takes place for all of the pertinent pixels. In consequence, there has been strongly desired a countermeasure of removing the disadvantage.

SUMMARY OF THE INVENTION

It is therefore an object of the present invention to provide a method of manufacturing a liquid crystal display device in which the failed area including the electric linkage can be easily restored, thereby removing the problem above.

In addition, another object of the present invention is to provide a method of manufacturing a liquid crystal display device in which at occurrence of any possible disconnection in a signal line or an electrode, the area related to the disconnection can be recovered in a simply method.

Further another object of the present invention is to provide a liquid crystal display device and a method of manufacturing the same in which it is possible to easily restore any electric linkage taking place between a reference signal line and a video signal line disposed to intersect each other with an insulation film between the reference and video signal lines.

To achieve the objects according to an aspect of the present invention, there is provided a method of producing a liquid crystal display device using the in-plane switching method including a first transparent substrate, a second transparent substrate opposing to the first transparent substrate, and a liquid crystal layer disposed between the first and second transparent substrates, either one of the substrates including pixel regions, each of the pixel regions including a display electrode and reference electrodes formed therein, wherein an electric field is generated between the display and reference electrodes to be substantially parallel with the transparent substrates, thereby modulating light passing through the liquid crystal layer. The display electrode is supplied with a video signal from a video signal line via a switching element, the element being turned on in response to supply of a scan signal to a scan signal line. The reference electrode is supplied with a reference signal from a reference signal line. The method including the steps of check an electric linkage between the video signal line and the reference electrodes adjacent thereto and disconnecting, according to a result of the check indicating the electric linkage, the reference electrodes on both sides of the pertinent electric linkage in a region on the side of the reference signal line.

According to the method of the liquid crystal display device thus constructed, when the reference electrode is disconnected as above, the separated portion of the reference electrode on its tip side thereof does not perform the inherent function thereof and hence the region in which an effective electric field contributing to the display operation is reduced between the display electrode and the reference electrode, resulting in a slight failure due to a point defect.

However, the point defect is not particularly conspicuous in the overall display screen and hence it can be considered that the display device satisfactorily effects its functions.

Consequently, it is possible to simply remove the defect of the pixels associated with the common reference signal line, namely, the failure caused by a so-called line defect.

According to another aspect of the present invention, there is provided a liquid crystal display device, comprising a first transparent substrate, a second transparent substrate opposing to the first transparent substrate, and a liquid crystal layer disposed between the first and second transparent substrates. Pixel regions are provided on surfaces of the substrates on the liquid crystal side. Each of the pixel regions includes a display electrode and reference electrodes formed therein, wherein voltages are applied to the display and reference electrodes to generate an electric field in the liquid crystal to be substantially parallel to the transparent substrates, thereby modulating light passing through the liquid crystal layer.

The display electrode is supplied with a video signal from a video signal line via a switching element, the element being turned on in response to supply of a scan signal to a scan signal line.

The reference electrodes is supplied with a reference signal from a reference signal line.

The reference electrodes respectively of the pixel regions adjacent to each other and commonly connected to the reference signal line are electrically linked to each other through other than the reference signal line.

In the liquid crystal display device having the configuration above, even when an electric linkage takes place between the reference signal line and the video signal line, the failure due to the electric short-circuit can be removed by disconnecting the reference signal line on both sides of the pertinent short-circuited position.

Even when the reference signal line is thus disconnected, the construction of the display device provides a conductive route through the reference electrodes so that the device continuously serves its functions.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Prior to explanation of an embodiment of the present invention, description will be given of an embodiment of the configuration of the liquid crystal display device using the in-plane switching to which the present invention is applicable. In this connection, an example of the device construction has already been described in the U.S. Ser. No. 08/123,472 filed on Sep. 20, 1993 (corresponding to EPA-05 88 562 published on Mar. 23, 1994) on the basis of the JP 249938192 and JP 7355193 assigned to the present assignee.

Figure 1:
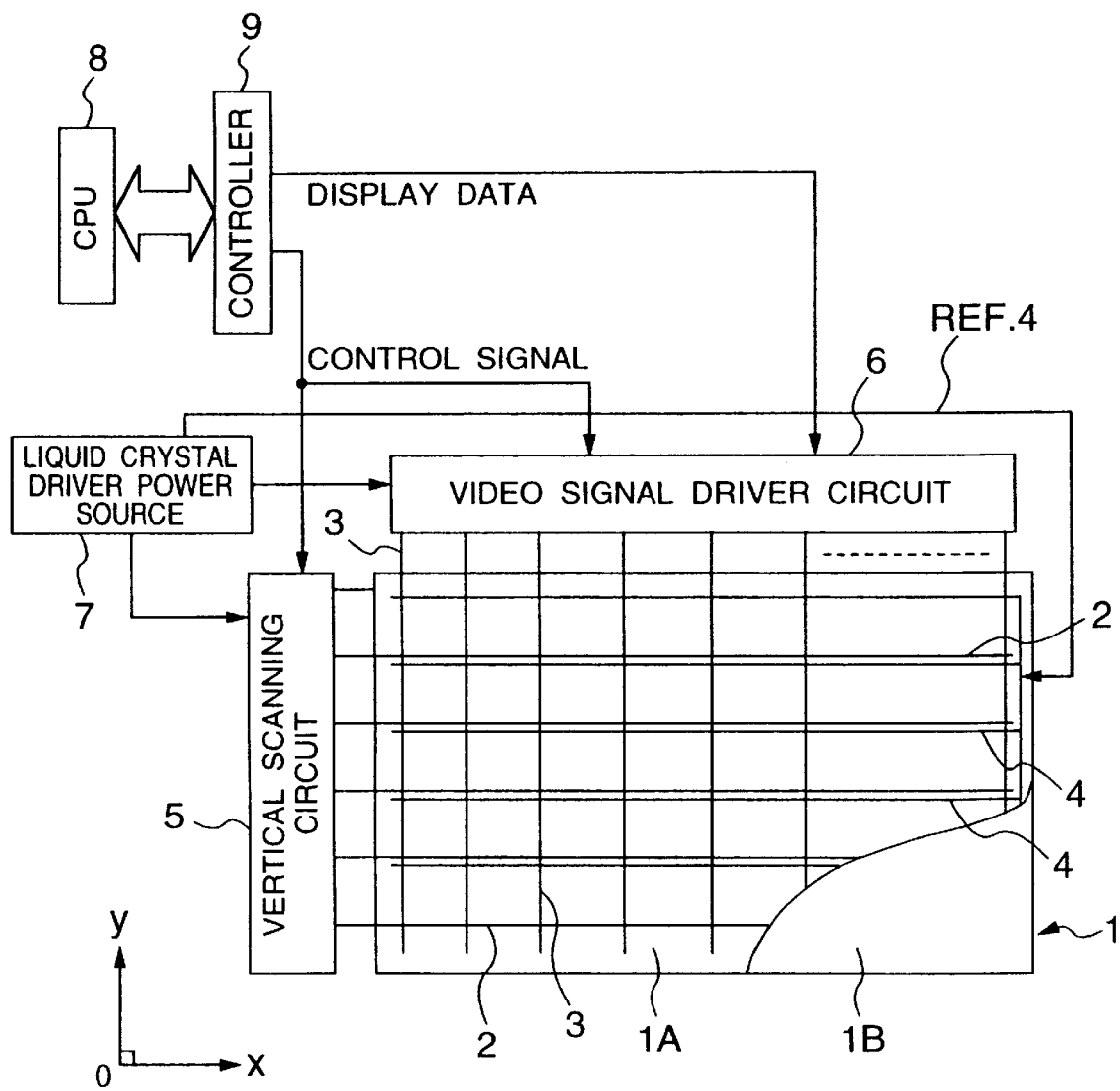
FIG. 1 is a diagram showing the configuration of an embodiment of a liquid crystal display device and a driving circuit thereof in relation to the manufacturing method according to the present invention.

As can be seen from FIG. 1, the configuration includes a liquid crystal display device 1 including a liquid crystal layer and a first transparent substrate 1A and a second transparent substrate respectively disposed on both opposing surfaces of the crystal layer such that on a surface of the substrate 1A, scan signal lines 2 and reference signal lines 4 are formed along an x-axis (row) direction and in parallel with each other along a y-axis (column) direction.

In this case, the lines are arranged in the diagram starting at the upper-most position of the substrate 1A in a sequence of a reference signal line 4, a scan signal line 2 apart from the line 4 with a relatively large distance, a reference signal line 4 apart from the line 2 with a relatively small distance, a scan signal line 2 apart from the preceding line 4 with a relatively large distance, and so on.

Moreover, there are fabricated video signal lines 3 along the y-axis direction in parallel with each other with a fixed interval therebetween, the lines 3 being insulated from the scan and reference signal lines 2 and 4.

In this structure, each rectangular region which is enclosed with the scan, reference, and video signal lines 2, 4, and 3 and which has a relatively large area is used as a region in which a unitary pixel is formed. The pixels are arranged in a matrix form to construct a display screen area. The detailed configuration of the pixel will be described later.

For the liquid crystal display device 1, there is disposed an external circuit including a vertical scan circuit 5 and a video signal driver circuit 6. The circuit 6 sequentially supplies a scan signal (voltage) to the respective scan signal line 2 such that the driver 6 feeds a video signal (voltage) to the video signal lines 3 at timing synchronized with the scan signals.

In this regard, the vertical scan circuit 5 and video signal driver 6 are powered by a liquid crystal driver power source 7. Moreover, video information from a central processing unit (CPU) 8 is subdivided into display data and control signals by a controller 9 such that the obtained display data and control signals are supplied to the circuits 5 and 6.

Additionally, a voltage to be applied to the reference signal line 4 is also produced from the liquid crystal driver power source 7.

Subsequently, description will be given of an example of the pixel in the liquid crystal device 1 constructed as above.

Figure 2:
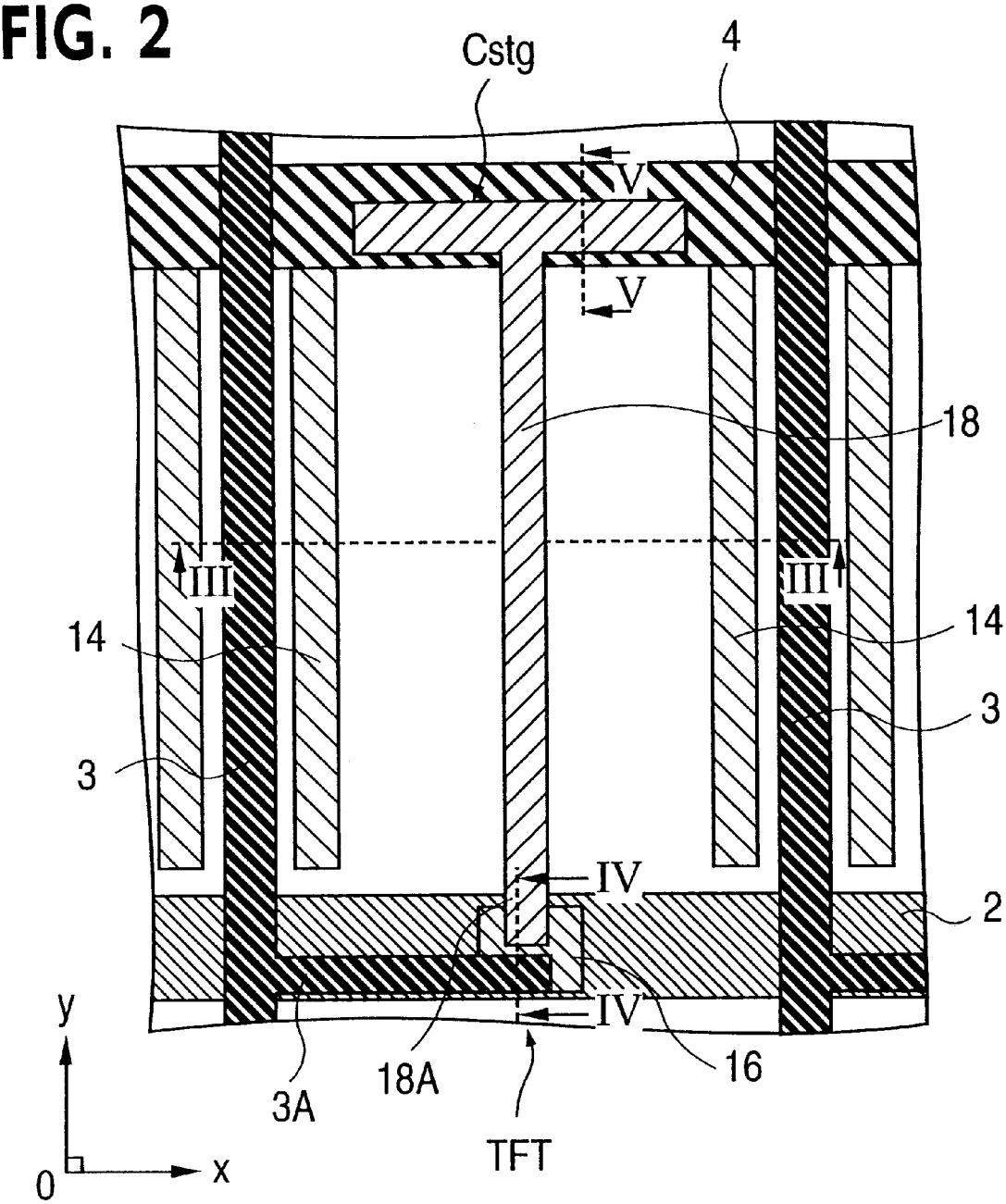
FIG. 2 is a plan view showing the primary portion of an embodiment of a liquid crystal display device in relation to the manufacturing method according to the present invention.

FIG. 2 is a plan view showing an embodiment of the pixel in the device 1. In this regard, FIGS. 2 to 5 respectively show cross-sectional views of the construction taken along lines III—III, IV—IV, and V—V, respectively.

In FIG. 2, on a principal surface of the transparent substrate 1A, there are formed a reference signal line 4 extending in the x-axis direction and a scan signal line 4 in parallel therewith, the line 4 being separated from the scan signal lines 4 (2).

In this case, the reference signal line 4 includes two reference electrodes 14 in an integral fashion. That is, the reference electrodes 14 extend in the negative direction along the y axis in this diagram of the pixel region formed with the lines 4 and 2 and a pair of video signal lines 3, which will be described later, up to the vicinity of the scan signal line 2, each reference electrode 14 being in the neighborhood of the associated video signal line 3.

On a surface of the transparent substrate 1A n which the scan signal line 2, reference signal line 4, nd reference electrodes 14 are thus fabricated, there is formed an insulation film 15 (reference is to be made to FIGS. 3 to 5) including, e.g., a silicon nitride film to cover the scan signal line 2 and the like. The insulation layer 15 functions for the video signal line 3 as an inter-layer insulation film at an intersection between the scan and reference signal lines 2 and 4. Moreover, the layer 15 serves as a gate insulation film in a region in which a thin film transistor (TFT) is manufactured and as a dielectric film in a region in which a capacitor Cstg is formed.

Fabricated on a surface of the insulation film 15 is a semiconductor layer 16 in the TFT forming region. The layer 16 is made of, for example, amorphous silicon which is accumulated in an overlapping manner on a portion of the scan signal line 2 in the proximity of the video signal line 3. As a result, the pertinent portion of the scan signal line 2 serves also as a gate electrode of the thin film transistor.

Formed on a surface of the insulation film 15 above are video signal lines 3 in parallel with each other in the x-axis direction, the lines 3 extending in the y-axis direction as shown in FIG. 2.

The video signal line 3 includes a drain electrode 3A integrally formed to extend up to a portion of the surface of the semiconductor layer 16 related to the thin film transistor.

Furthermore, there is fabricated a display electrode 18 on a surface of the insulation film 15 in the pixel region. The display electrode 18 extends in the y-axis direction at substantially an intermediate position between the reference electrodes 14 to substantially equally subdivide the pixel region. In other words, the display electrode 18 has a first end portion functioning as a source electrode 18A of the thin film transistor and further extends in the negative direction along the y axis. The electrode 18 has a second end portion which is formed on the reference signal line 4.

In this case, the second end portion 4 of the display electrode 18 on the reference signal line 4 has a relatively large area and constitutes a storage capacitor Cstg including the insulation film 15 as its dielectric film between the reference signal line 4 and the second end portion 4. The capacitor Cstg advantageously leads to an effect that video information stored in the display electrode 18 is kept therein for a long period of time when the thin film transistor is turned off.

Incidentally, a surface of the semiconductor layer 16 corresponding to the boundary between the drain electrode 3A and source electrode 18A of the thin film transistor is doped with phosphor (P) to form a high-density or highly-doped layer, establishing an ohmic contact for the respective electrodes described above. In this case, the high-density layer is provided in the overall region of the surface of the semiconductor layer 16. After the electrodes above are fabricated, an etching process is carried out using these electrodes as a mask to remove the high-density layer in other than the regions of the electrodes, thereby obtaining the configuration above.

On an upper surface of the insulation film 15 associated with the thin film transistor, video signal lines 3, display electrode 18, and capacity Cstg, there is fabricated a protective film 19 (FIGS. 3 to 5) including, for example, a silicon nitride film. Formed on the protective layer 19 is an alignment film 20 to constitute a so-called lower substrate of the liquid crystal device. In this regard, a polarizer plate 21 is arranged on a surface of the lower substrate opposing the liquid crystal side.

In a portion on the liquid crystal side of the transparent substrate functioning as a so-called upper substrate, there is manufactured a light shielding film 22 in a portion thereof corresponding to the boundary area between the respective pixel regions. The shielding film 22 prevents light from directly entering the thin film transistor and improves the contrast of images displayed. For this purpose, the film 22 includes an opening, which substantially constitutes the pixel region.

In addition, a color filter 23 is fabricated over the opening of the light shielding film 22. The filter 23 has a color different from that of the pixel region adjacent thereto in the x-axis direction. Moreover, the filter 23 includes a boundary area on the light shielding film 22. Formed on a surface of the color filter 23 is a flat film 24 including a resin film or the like. On a surface of the film 24 is then fabricated an alignment or orientation film 25. In this connection, a polarizer plate 26 is arranged on a surface of the upper substrate opposing to the liquid crystal side.

Figure 6:
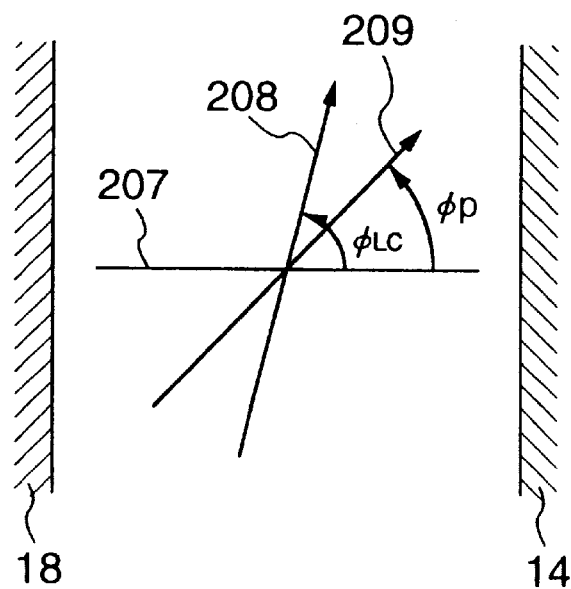
FIG. 6 is a diagram for explaining a relationship between a alignment film and a polarizer film of a liquid crystal display device associated with the manufacturing method according to the present invention.

Referring now to FIG. 6, description will be given of relationships between the alignment film 20 and polarizer 21 on the side of transparent substrate 1A and between the alignment film 25 and polarizer 26 on the side of transparent substrate 1B.

With respect to a direction 207 of an electric field applied between the display electrode 18 and the reference electrode 14, a rubbing direction 208 of the alignment films 20 and 25 has an angle of inclination φLC. The liquid crystal layer LC includes a nematic liquid crystal having a positive dielectric constant anisotropy of Δε taking a value of 7.3 (for 1 kHz) and a refractive index anisotropy Δn taking a value of 0.073 (for 589 nm at 20° C.).

Assume φLC to be 85° C. in the embodiment. Moreover, assume that the angle φP of the direction of polarized light passing axis 209 of the polarizer 21 is φLC and the direction of polarized light passing axis of the polarizer 26 is orthogonal to the direction of φP.

The configuration including the alignment films 20 and 25 and polarizer plates 21 and 26 having the relationship therebetween is associated with a so-called normally black mode. Namely, the light passing through the liquid crystal layer LC is supervised by generating an electric field E in the layer LC in parallel to the transparent substrate 1A. Particularly, in a state in which the electric filed is absent between the reference electrodes and the display electrode, the light is shielded to achieve a so-called "black state".

Embodiment 1

Figure 7A:
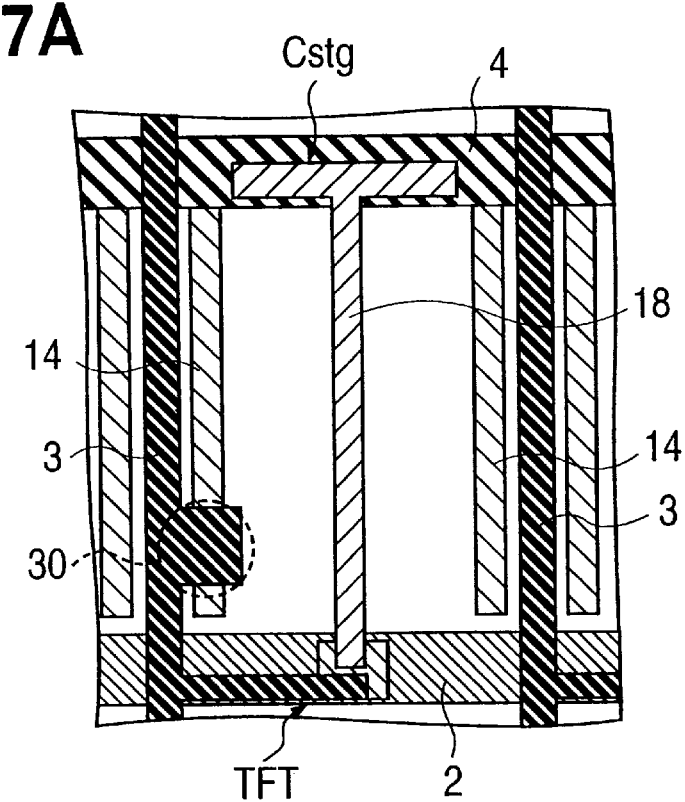
FIGS. 7A and 7B are diagrams for explaining an embodiment of the method of manufacturing a liquid crystal display device according to the present invention.

In a process of fabricating the lower substrate of the liquid crystal device having the configuration above, assume that an electric short-circuit or linkage 30 (indicated by a broken-line circle) occurs between the video signal line 3 and the reference electrode 14 adjacent thereto during the fabrication of the video signal line 3, for example, as shown in FIG. 7A corresponding to FIG. 2. The failed position can be detected in the TFT manufacturing process by checking by a thermoviewer the amount of heat generated at the position when a potential difference is applied between the video signal line 3 and the reference signal line 4. For this purpose, it is only necessary to adopt, for example, the known technology described in JP-B-7-78673. Furthermore, there may also be additionally employed the known pattern recognition technology.

The electric failure occurs when the video signal line 3 is not formed exactly according to the pattern and a portion thereof extends toward the side of the reference electrode 14 and the effect of insulation of the insulation film 15 is insufficient between the reference electrode 14 and the signal line 3.

In such a case, the reference signal line 4 common to the pixels arranged in the x-axis direction to be parallel with each other has an electric potential of the video signal line, leading to a line failure in which each pixel loses capability of its display function. Only when the line failure is removed, all pixels associated with the lower substrate can operate as complete elements of the display device.

Figure 7B:
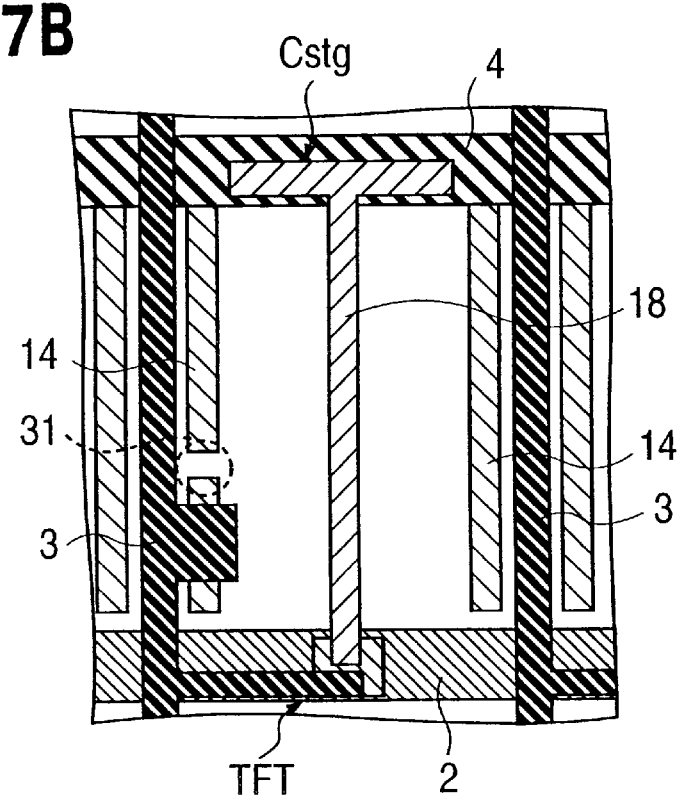

To overcome the disadvantage according to the embodiment, a restoration process is conducted for the reference electrodes 14 on both sides of the failed position such that one of these electrodes 14, for example, the electrode 14 on the side of reference signal line 4 is disconnected by a laser beam to form a disconnected portion 31 (indicated by a broken-line circle) as shown in FIG. 7B. The disconnection of the line 4 can be achieved using the known technology, e.g. JP-B-7-78673. The laser beam has a small radius and can be illuminated exactly onto a target position in a scanning fashion, which facilitates the disconnecting operation described above.

For the disconnected reference electrode 14, the area thereof contributing to the generation of the effective electric field in relation to the display electrode 18 is reduced, resulting in a slight point defect. However, the effect of the point defect is substantially negligible in consideration of the overall operation of the display screen. Consequently, the disadvantage of the line failure above can be appropriately removed.

Figure 8:
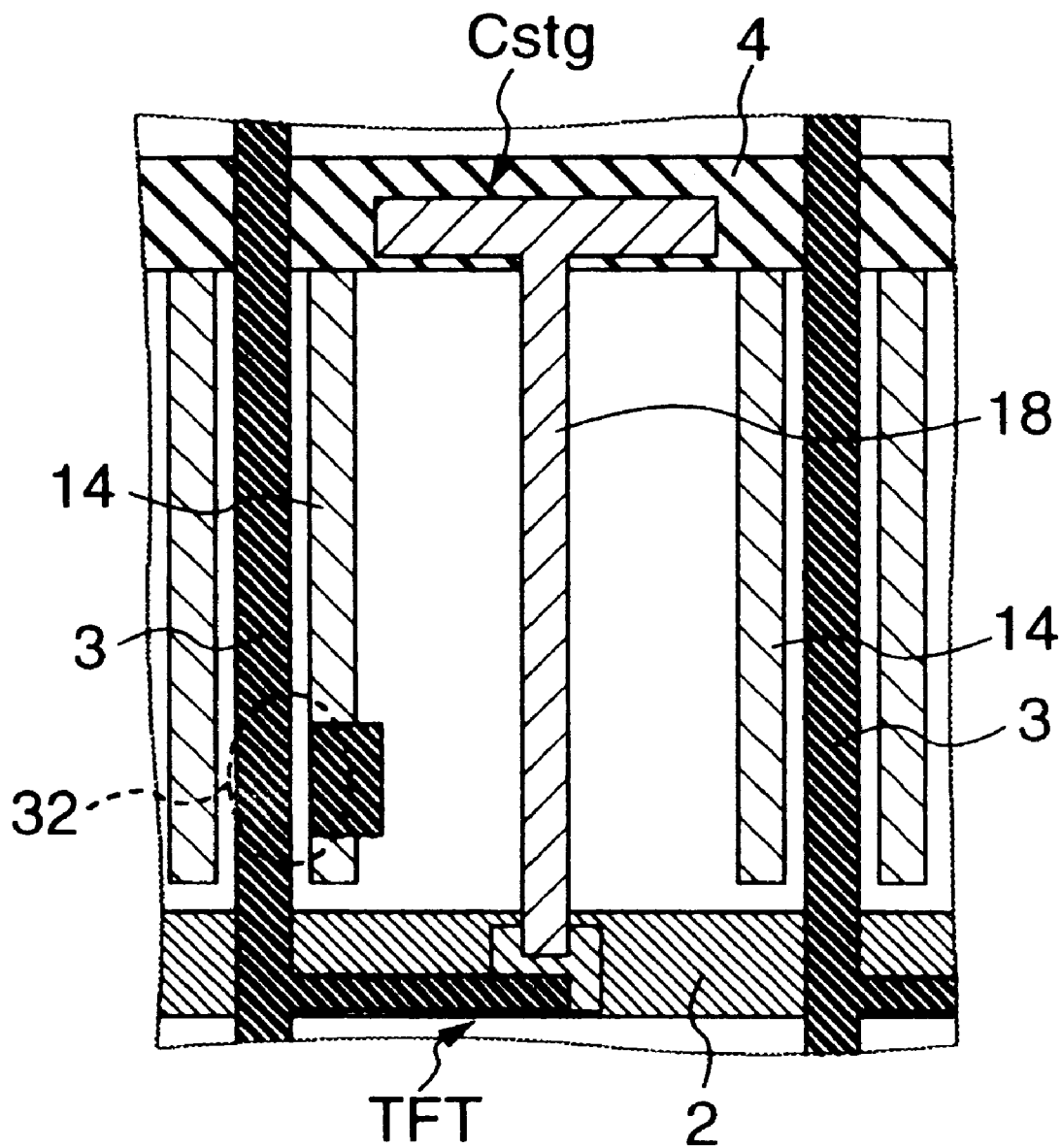
FIG. 8 is a plan view showing another embodiment of the method of manufacturing a liquid crystal display device according to the present invention.

In place of the defect removal process shown in FIG. 7B, there may be adopted a process of FIG. 8 in which the extending portion of the video signal line 3 toward the side of reference electrode 14 is disconnected along the longitudinal direction of the video signal line 3 to form a disconnected portion 32 (indicated by a broken-line circle) while appropriately preventing the video signal line 3 from being disconnected.

Thanks to the process, even when the extending portion of the video signal line 3 is disconnected during the operation to remove a large portion of the reference electrode in the vicinity of the failed position, the advantageous effect described above can be similarly attained.

Embodiment 2

Figure 9A:
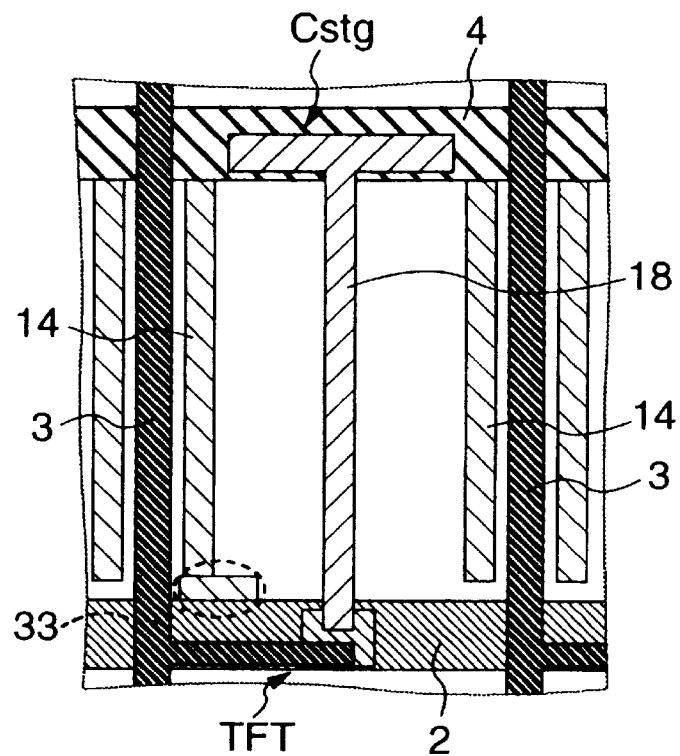
FIGS. 9A and 9B are plan views showing further another embodiment of the method of manufacturing a liquid crystal display device according to the present invention.

Assume an electric linkage occurs between the reference electrode 3 and the scan signal line 2 adjacent thereto in the process of fabricating the reference electrode 14 and reference signal line 4 as shown in FIG. 9A associated with FIG. 2.

The reference signal line 4 is integrally formed with the reference electrodes 14 at the layer level of the scan signal line 2. Additionally, an end portion of the reference electrode 14 extending from the reference signal line 4 is disposed remarkably in the vicinity of the scan signal line 2 in consideration of the ratio of opening or aperture. Consequently, onto the area between the end portion of the reference electrode and the scan signal line 2, residuals of materials constituting these elements are attached. This causes an increase in the probability of occurrence of the electric linkage 33 (indicated by a broken-line circle).

When such a disadvantage takes place, the reference signal line 4 common to the pixels arranged to be parallel with each other in the x-axis direction and the scan signal line 2 are set to an identical electric potential, leading to a so-called line defect. In this situation, all pixels in the lower substrate can satisfactorily functions only when the line defect is removed.

Figure 9B:
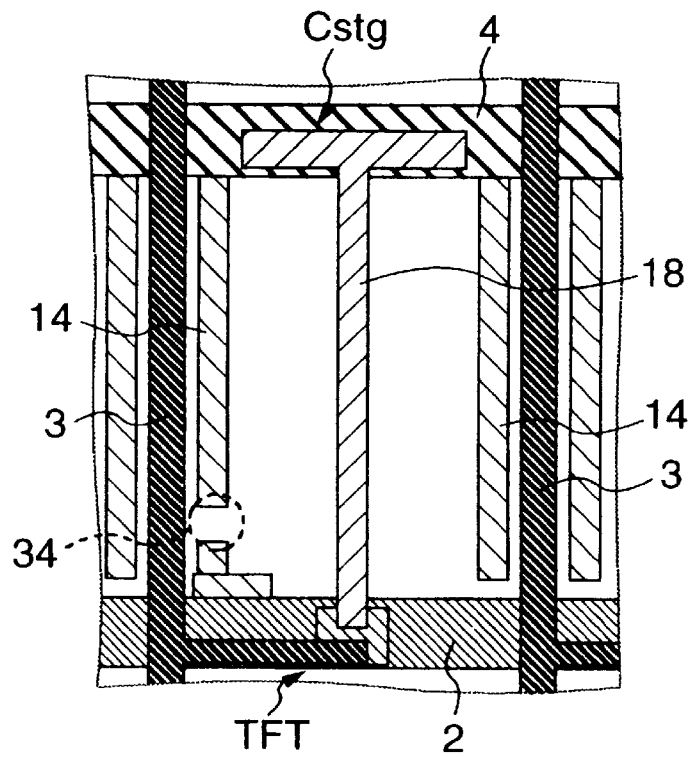

To cope with the difficulty according to the present embodiment, the reference electrode 14 is disconnected, as shown in FIG. 9B, at a portion thereof in the proximity of the failed position by use of, for example, a laser beam to resultantly form a disconnected portion 34 (denoted by a broken-line circle). Thanks to the provision, the defect is advantageously removed in a similar fashion similar to that used in the embodiment 1.

Embodiment 3

In embodiments 1 and 2, the reference electrode 14 disposed adjacent to the video signal line 3 with quite a slight distance thereto is disconnected, for example, by a laser beam to thereby remove the disadvantage caused by the line defect.

Figure 10A:
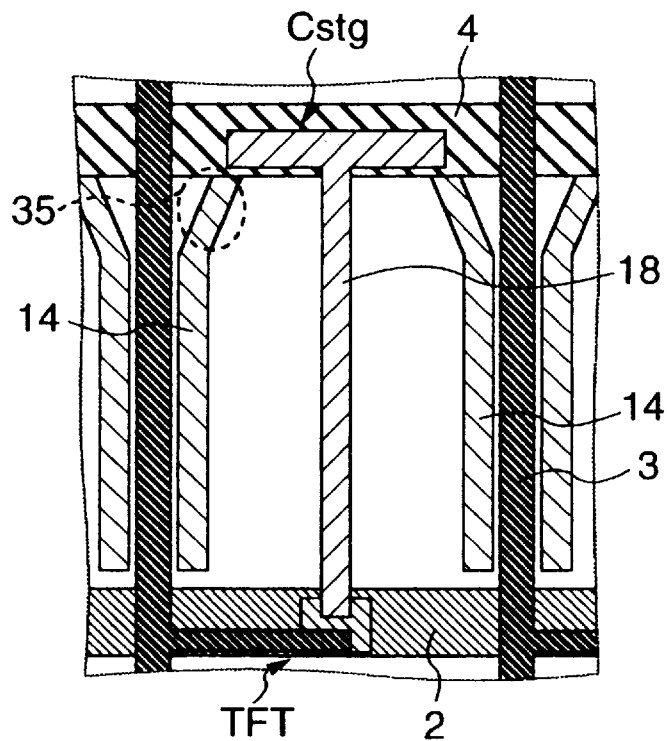
FIGS. 10A and 10B are plan views showing still another embodiment of the method of manufacturing a liquid crystal display device according to the present invention.

FIG. 10A shows in a plan view an embodiment of a liquid crystal display device in which the disconnection of the reference electrode can be easily accomplished.

In FIG. 10A corresponding to FIG. 2, the materials having the same reference numerals as those of FIG. 2 are assumed to have the same functions, respectively. The construction of FIG. 10A is different from that of FIG. 2 in the pattern to manufacture the reference electrode 14. Namely, the reference signal line 4 extending from the reference electrode 14 formed adjacent to the video signal line 3 with a slight distance thereto is more apart from the video signal line in the vicinity of the reference signal line 4.

With this structure, a portion of the electrode 14 is fabricated to slightly enter the pixel region (designated by a broken-line circle 35). However, the pertinent portion is a corner of the pixel region and hence an influence thereof on the ratio of opening is negligible.

Figure 10B:
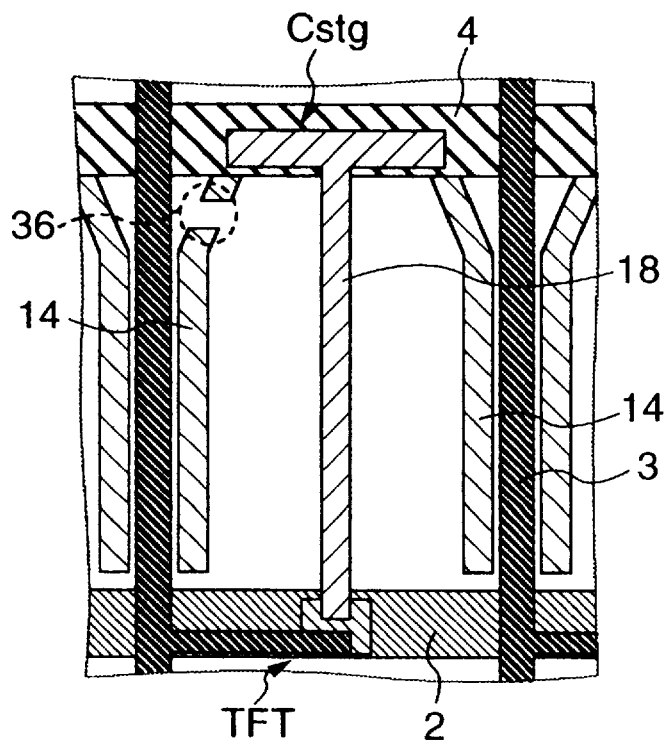

In the liquid crystal device configured as above, it is only necessary as shown in FIG. 10B to set the disconnecting position of the reference electrode 14 o be largely apart from the video signal line so as to disconnect only the reference electrode 14 without exerting any damage to the video signal line 3 (indicated by a broken-line circle 36).

The advance specification of the disconnecting position of the reference electrode 14 leads to an advantage that the complex signal processing system necessary for the decision of the position of disconnection can be dispensed with.

Embodiment 4

Figure 11A:
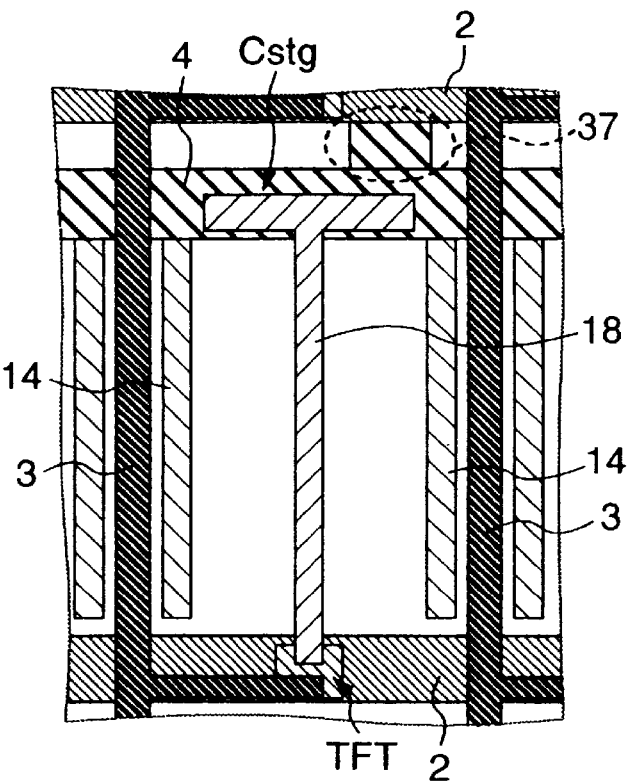
FIGS. 11A and 11B are plan views showing another embodiment of the method of manufacturing a liquid crystal display device according to the present invention.

Assume that an electric short-circuit or linkage occurs between the scan signal line 2 and the reference signal line 4 in a position of the pixel regions arranged to be parallel to each other in the x-axis direction as shown in FIG. 11A corresponding to FIG. 2.

The scan signal line 2 and reference signal line 4 are fabricated at an identical layer level. When the configuration is manufactured to improve the ratio of opening, these lines 2 and 4 are arranged to be adjacent to each other with a slight distance therebetween. Consequently, residuals 37 of the materials of these lines 2 and 4 are attached onto the region therebetween, increasing the chance of occurrence of the electric linkage therebetween.

Also in this case, the reference signal line 4 common to the pixel regions disposed to be parallel with each other in the x-axis direction is set to the electric potential of the scan signal line 2, which results in a line defect.

Figure 11B:
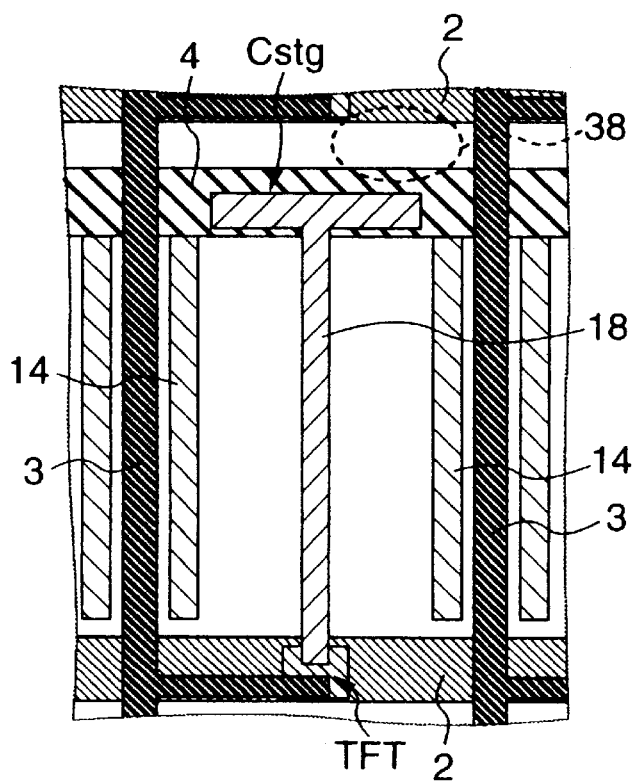

To remove the failure according to this embodiment, the position of residuals 37 causing the failure is disconnected, namely, is removed by, for example, a laser beam to obtain a removal portion 38 as shown in FIG. 11B.

Thanks to the provision, the advantageous effect of embodiment 2 can be similarly attained.

Embodiment 5

Figure 3:
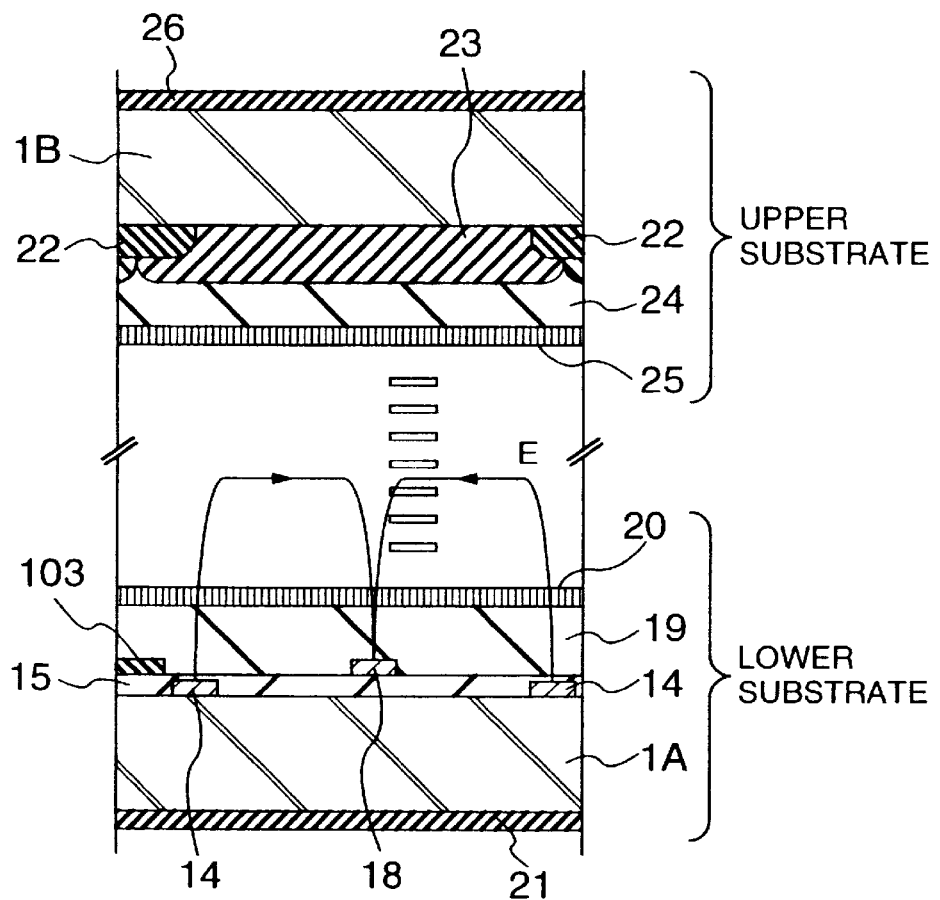
FIG. 3 is a cross-sectional view taken along line III—III of FIG. 2.
Figure 12A:
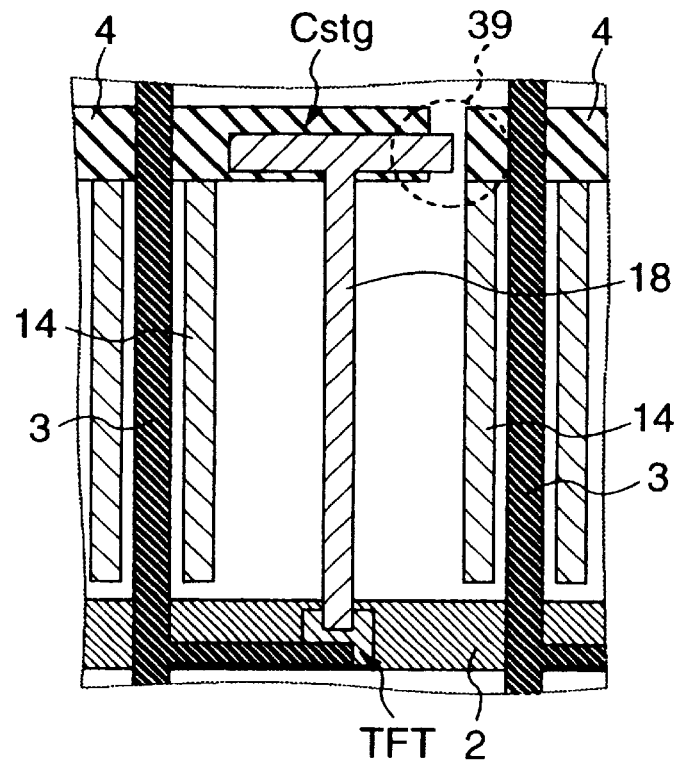
FIGS. 12A and 12B are plan views showing another embodiment of the method of manufacturing a liquid crystal display device according to the present invention.
Figure 12B:
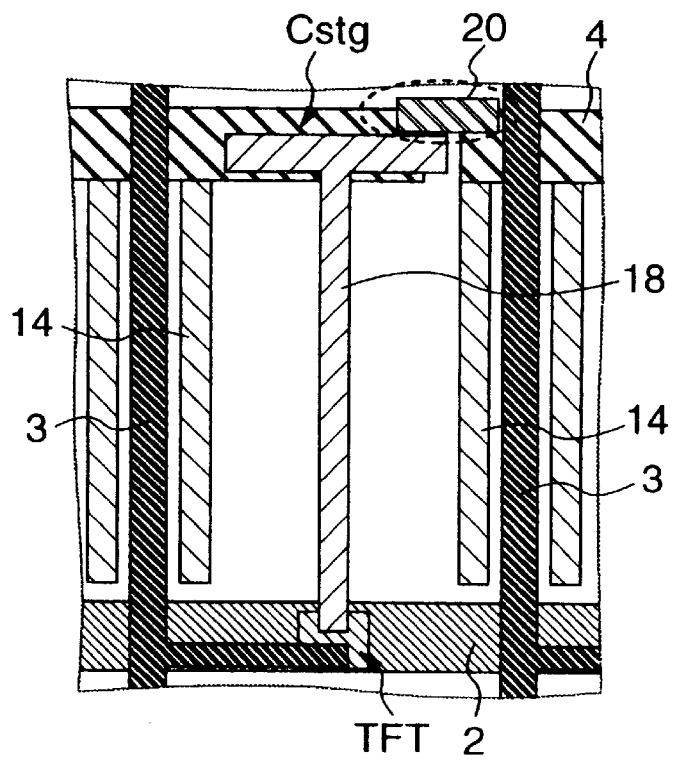

As shown in FIG. 12A corresponding to FIG. 3, assume that the reference signal line 4 is disconnected at a portion thereof (indicated by a broken-line circle 39). In the inspection of the disconnection, the electrode pattern of each pixel is shot by a camera to collect information thereof to achieve the comparison of the obtained information between the respective patterns. The disconnection is detected as a pattern abnormality portion as a result.

Since the reference signal line 4 is common to the pixels disposed to be parallel to each other in the x-axis direction in this embodiment, the disconnection obviously causes a line defect.

In this case, a film 20 (designated by a broken-line circle) is formed with an electrically conductive substance on the disconnected position to thereby establish an electric connection for the disconnected reference signal line portions 4.

In the process above, the conductive film is fabricated using the known photo chemical vapor deposition (CVD).

Namely, there is formed an atmosphere containing a material for the fabrication of the film on the failed position such that the atmosphere is applied onto the pertinent configuration and the failed position is scanned with the laser beam in the atmosphere, thereby easily fabricating the desired film.

Embodiment 6

Figure 13A:
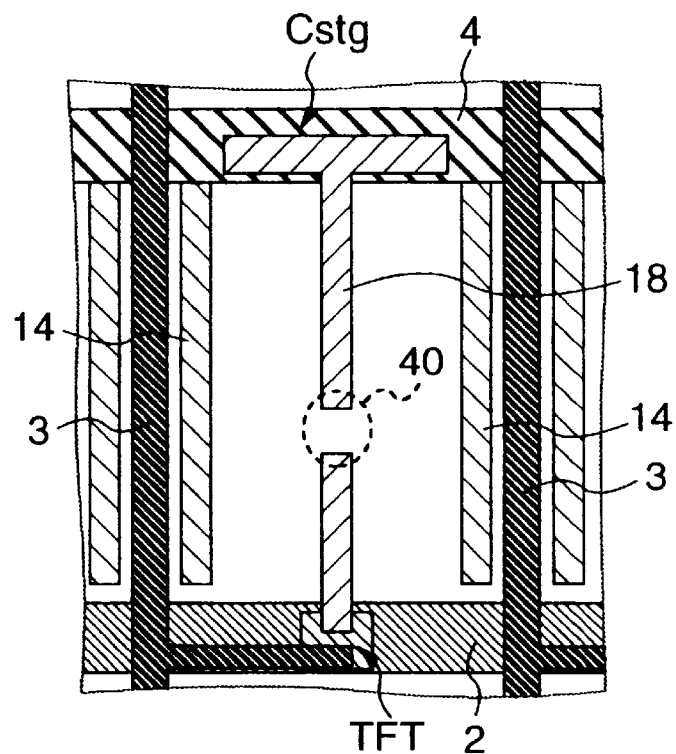
FIGS. 13A and 13B are plan views showing another embodiment of the method of manufacturing a liquid crystal display device according to the present invention.
Figure 13B:
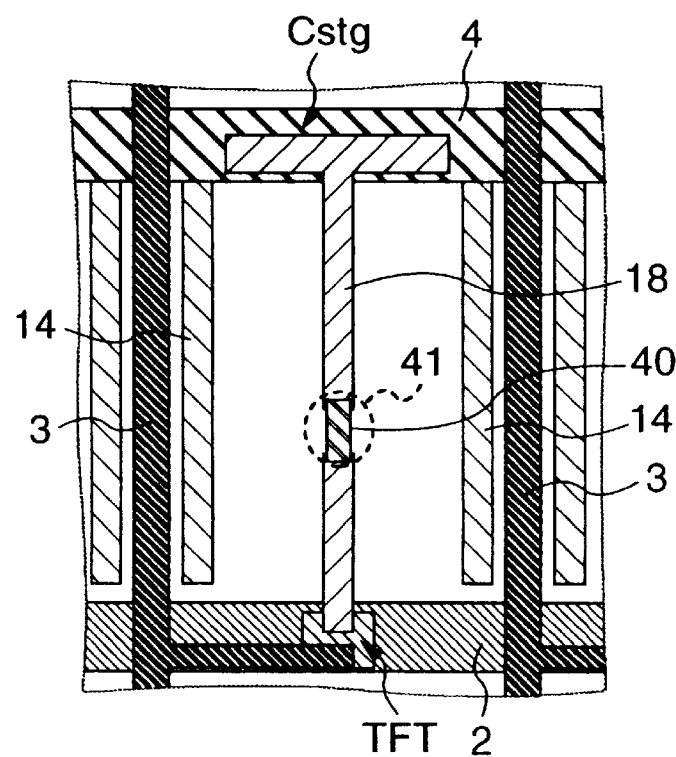

As can be seen from FIGS. 13A and 13B associated with FIG. 2, assume that the display electrode 18 is manufactured in a disconnected state at a portion 40 (denoted by a broken-line circle).

In this situation, only the pixel related to the disconnected display electrode 18 becomes abnormal, resulting in a so-called point defect.

In such a case, as shown in FIG. 13B, a film 40 is fabricated with an electrically conductive material at the disconnected position by the photo CVD to restore the electric connection of the display electrode 18 (designated by a broken-line circle 41).

In this regard, when the disconnection takes place in the reference electrode 14, the same recovery process can be also effectively utilized.

According to embodiment 6, the disconnected position of the liquid crystal display device can be recovered in a simple method.

Embodiment 7

Figure 14:
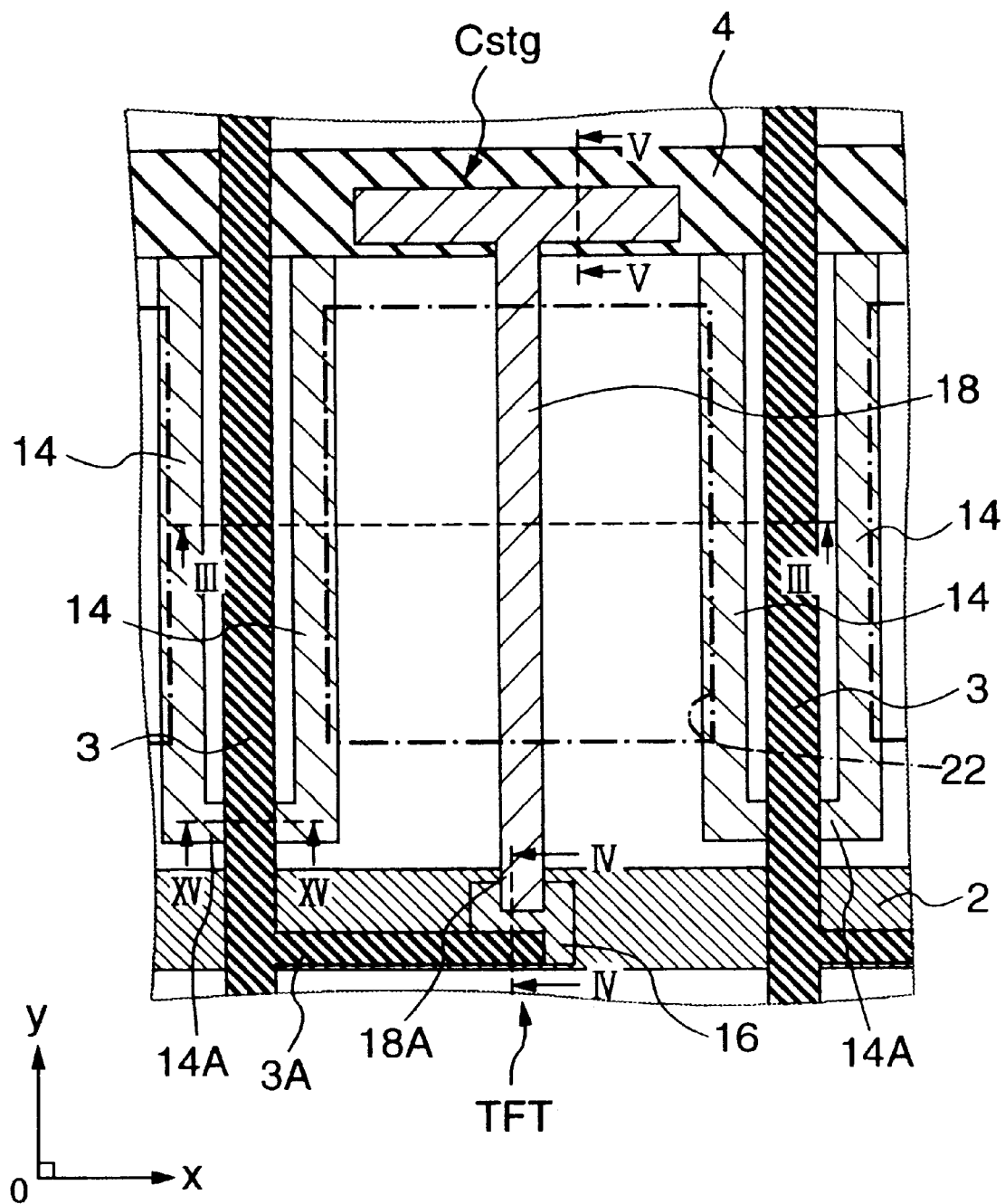
FIG. 14 is a plan view showing the primary portion of an embodiment of the liquid crystal display device according to the present invention.
Figure 15:
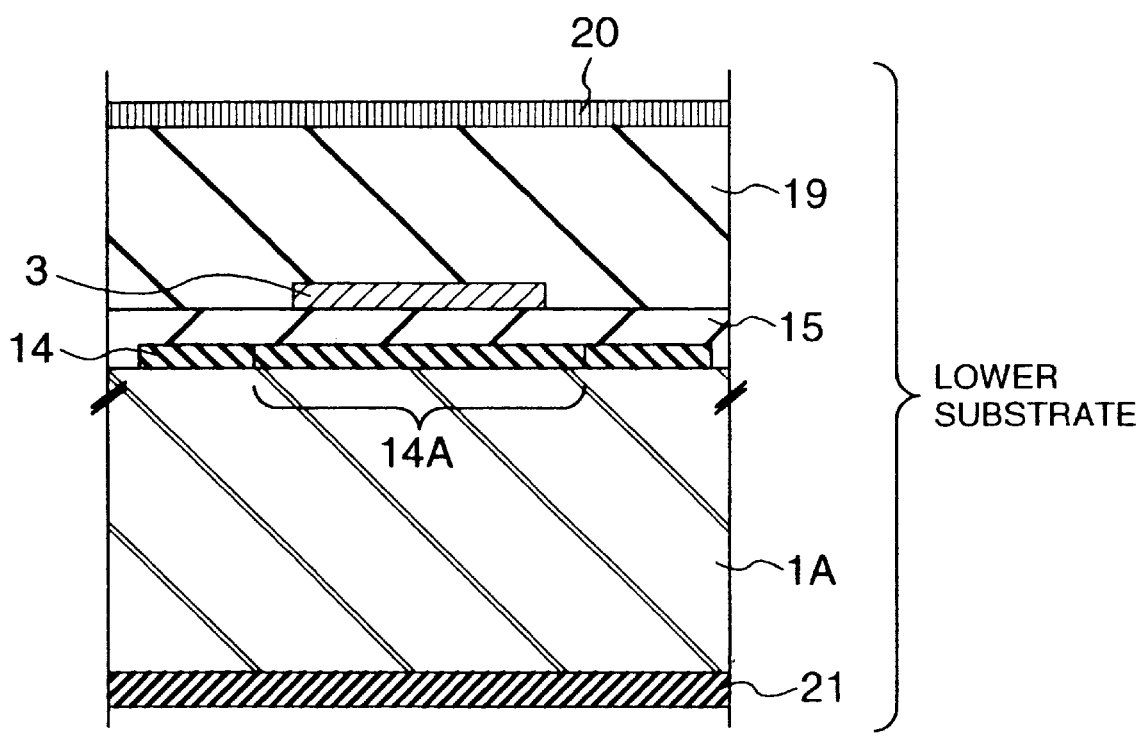
FIG. 15 is a cross-sectional view taken along line XV—XV of FIG. 14.

FIG. 14 shows a plan view of an embodiment of the unitary pixel in the liquid crystal display device 1. In this connection, FIGS. 3 to 5 respectively show the cross-sectional views respectively taken along lines III—III, IV—IV, and V—V of FIG. 14.

In FIG. 14, there are formed on a primary surface of the transparent substrate 1A (FIGS. 3 to 5) a reference signal line 4 and a scan signal line 2 disposed apart therefrom and in parallel thereto.

In the structure, the reference signal line 4 includes two reference electrodes 14 integrally formed therewith. That is, each reference electrode 14 extends in the negative direction along the y-axis of a pixel region defined by a pair of video signal lines 3, which will be described later. Namely, the electrode 14 extends along the respective video signal line 3 in the vicinity thereof up to a position in the vicinity of the scan signal line 2.

Moreover, particularly in this embodiment, the reference electrode 14 on the negative side of the x axis of the pixel region is electrically connected to the reference electrode 14 on the positive side of the x axis of a pixel region adjacent thereto on the negative side of the x axis via a conductor layer 14A formed on an end portion of each of the reference electrodes 14. Similarly, the reference electrode 14 on the positive side of the x axis of the pixel region is electrically connected to the reference electrode 14 on the negative side of the x axis of a pixel region adjacent thereto on the positive side of the x axis via the conductor layer 14A formed on an end portion of each of the reference electrodes 14.

Incidentally, since the conductor layer 14A can be patterned together with the reference electrodes, there is not required any special process to fabricate the layer 14A. Additionally, since the layer 14A is formed in a free space, the pixel region is not reduced in the production of the layer 14A.

On a surface of the transparent substrate 1A including the scan signal line 2, reference signal line 4, and reference electrodes 14, there is formed an insulator film 15 (reference is made to FIGS. 3, 4, 5, and 15), for example, a silicon nitride film covering the scan signal line 2 and the like. The insulator film 15 functions for the video signal line 3 as an inter-layer insulator film at an intersection between the scan signal line 2 and the reference signal line. Moreover, the film 15 serves as a gate insulation film in the region in which the thin film transistor is formed and as a dielectric film in the region in which the storage capacitor Cstg is fabricated.

Figure 4:
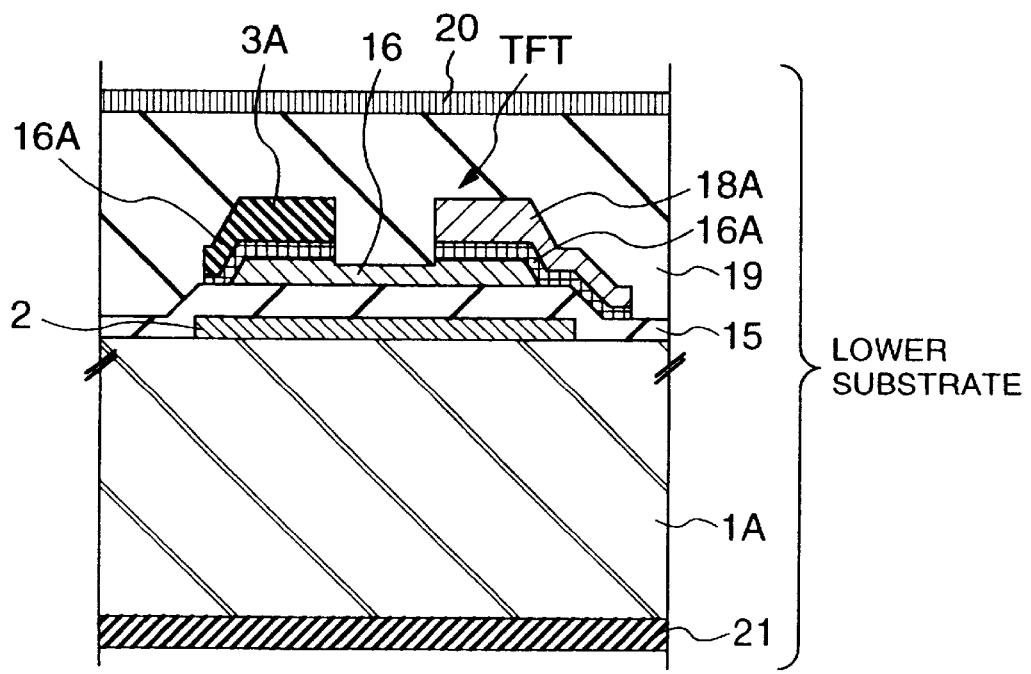
FIG. 4 is a cross-sectional view taken along line IV—IV of FIG. 2.
Figure 5:
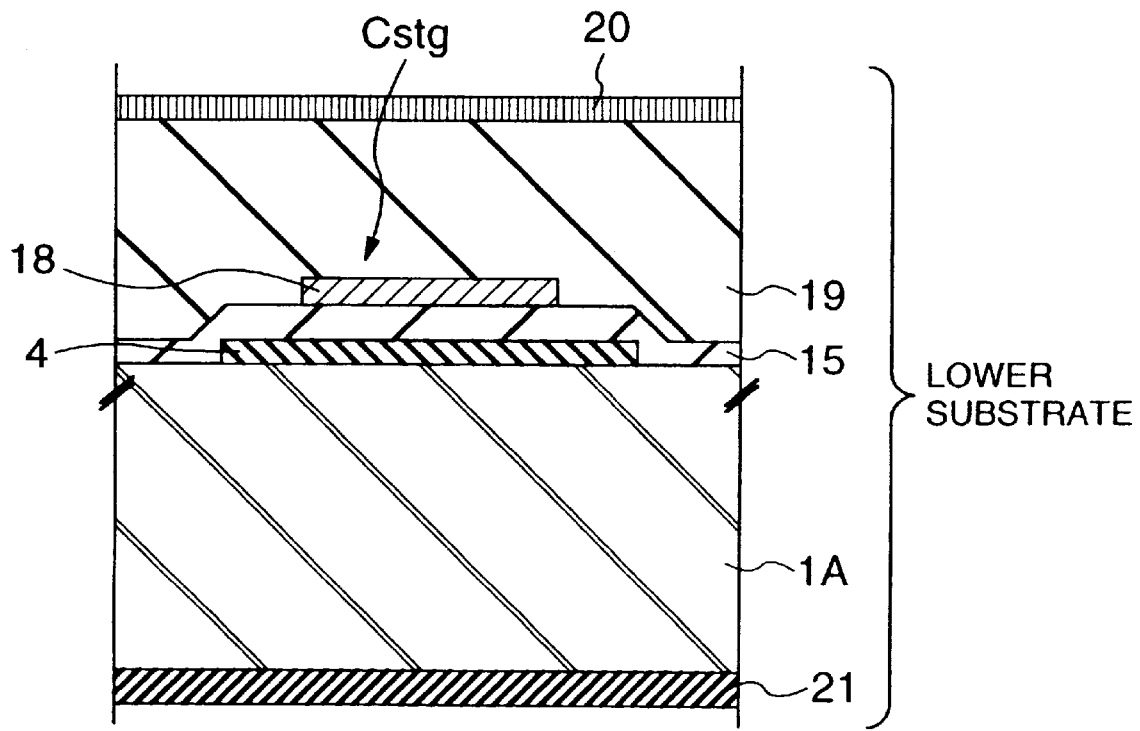
FIG. 5 is a c ross-sectional view taken along line V—V of FIG. 2.

Referring now to FIG. 4, there is formed on a surface of the insulator film 15 a semiconductor layer 16 in the region of the thin film transistor. The semiconductor layer 16 is formed with, for example, amorphous silicon and is disposed over the scan signal line 2 in the proximity of the video signal line 3. As a result, a portion of the scan signal line 2 functions also as a gate electrode of the thin film transistor.

On a surface of the insulator film thus fabricated, there are fabricated the video signal lines 3 extending in the y-axis direction and being parallel with each other in the x-axis direction as shown in FIG. 14. In this case, the video signal lines 3 are arranged to intersect not only the reference and scan signal lines 4 and 2 but also the conductor layer 14A via the insulator film 15, the layer 14A establishing an electric linkage between the reference electrodes 14.

The video signal line 3 extends up to a portion of a surface of the semiconductor layer 16 constituting the thin film transistor so as to form a drain electrode 3A in an integral fashion.

Moreover, on a surface of the insulator 15 in the pixel region, there is fabricated a display electrode 18 (18A). The electrode 18 extends in the y-axis direction at a central position of the pixel region to divide the pixel region into two sub-regions. That is, a first end portion of the display electrode 18 serves as a source electrode 18A of the thin film transistor. The electrode 18 extends in the positive direction of the y axis such that a second end portion thereof is fabricated over the reference signal line 4.

In this situation, the second end of the display electrode 18 formed over the reference signal line 4 has a relatively large area to constitute a storage capacitor Cstg including the insulator film 15 as a dielectric film between the second end portion and the reference signal line 4. The capacitor Cstg leads to an advantage, for example, that the video information is kept stored in the display electrode for a long period of time when the thin film transistor is turned off.

In this regard, phosphor (P) is doped in a surface of the semiconductor layer 16 corresponding to the boundary area between the drain electrode 3A and source electrode 18A of the thin film transistor to resultantly form a highly-doped layer 16A, which establishes an ohmic contact for the respective electrodes. In this case, the highly-doped layer 16A is fabricated on the overall surface region of the semiconductor layer 16. After these electrodes are formed, an etching process is conducted for the highly-doped layer 16A with the electrodes set as as the mask to etch the highly-doped region in other than the electrode regions, thereby obtaining the desired configuration.

Thereafter, on a surface of the insulator film 15 associated with the thin film transistor, video signal lines 3, display electrode 18, and storage capacitor Cstg, there is formed a protective film 19 (reference is made to FIGS. 3, 4, 5, and 15) including, for example, a silicon nitride film. Fabricated on an upper surface of the protective film 19 is an alignment layer 20 to form the so-called lower substrate of the liquid crystal display device. In this connection, a polarizer 21 is disposed on a surface of the lower substrate on a side opposite to the side of the liquid crystal layer.

In a portion on the liquid crystal side of the transparent substrate 1B constituting the so-called upper substrate, there is fabricated a light shielding film 22 in each of the portions thereof corresponding to boundary areas between the respective pixel regions as shown in FIG. 3. The shielding film 22 has a function to prevent light being directly illuminated onto the thin film transistor and a function to improve the contrast of an image presented on the display. The light shielding film 22 includes an area of a rectangular opening indicated by a dot-and-dash line in FIG. 14. The rectangular opening substantially configures the pixel region.

Furthermore, a color filter 23 is manufactured to cover the opening 22 of the light shielding film 22. The color filter 23 has a color different from that of the color filter of the adjacent pixel region in the x-axis direction. The filter 23 has a boundary area on the light shielding film 22. On a surface of the the color filter 23, there is fabricated a flat film 24 including, for example, a resin film on which an alignment film 25 is formed. In this regard, a polarizer plate 26 is arranged on a surface of the upper substrate on a side opposite to the liquid crystal side thereof.

The relationships between the alignment film 20 and the polarizer 21 fabricated on the side of the transparent substrate 1A and between the alignment film 25 and the polarizer 26 on the side of the transparent substrate 1B are the same as those of the embodiments described with reference to FIGS. 3 and 7 above.

Figure 16A:
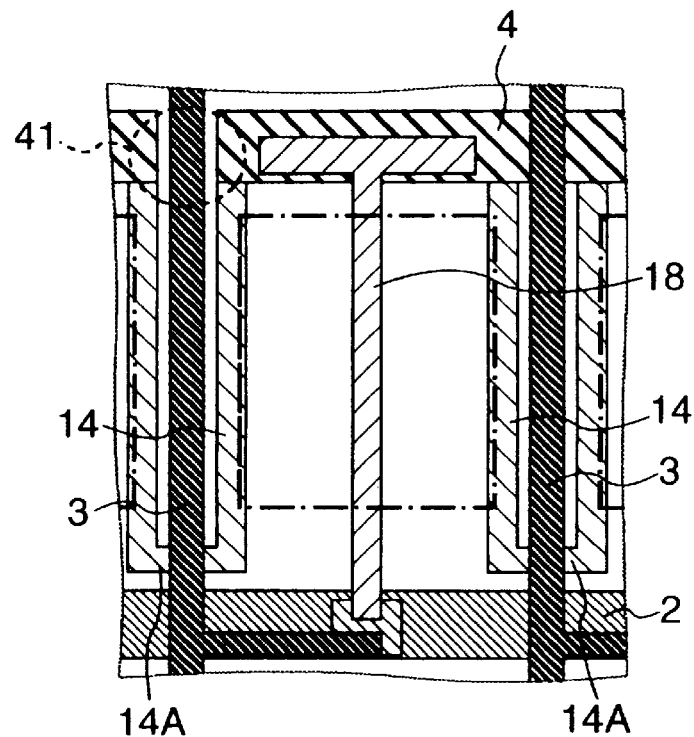
FIGS. 16A and 16B are plan views for explaining another embodiment of the liquid crystal display device according to the present invention.

In the liquid crystal display device, when an electric short-circuit or linkage (denoted as a portion 41 of a broken-line circle) takes place at an intersection between the reference signal lines 4 and the video signal line 3 with the insulation film 15 there between, the failure due to the electric linkage can be removed by disconnecting the reference signal lines 4 on both sides of the pertinent video signal line 3, specifically, by illuminating, for example, a laser beam onto the failed position as shown in FIG. 16A. In this case, since each of the disconnected reference signal lines 4 is electrically conductive through the conductor layer 14A particularly provided in this embodiment. Consequently, the reference signal lines 4 perform the normal function thereof.

Figure 16B:
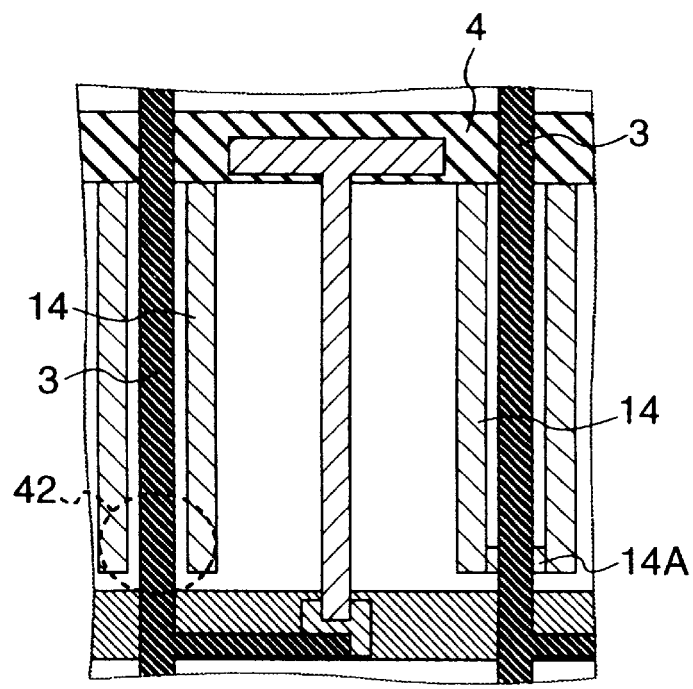

In this regard, assume an electric linkage takes place at an intersection between the reference signal lines 4 and the video signal line 3 due to presence of the conductor layer 14A in this embodiment. In such a case, it is only necessary to disconnect the conductor layer 4 at positions thereof on both sides of the video signal line 3 as shown in a portion 42 of FIG. 16B.

Embodiment 8

Figure 17:
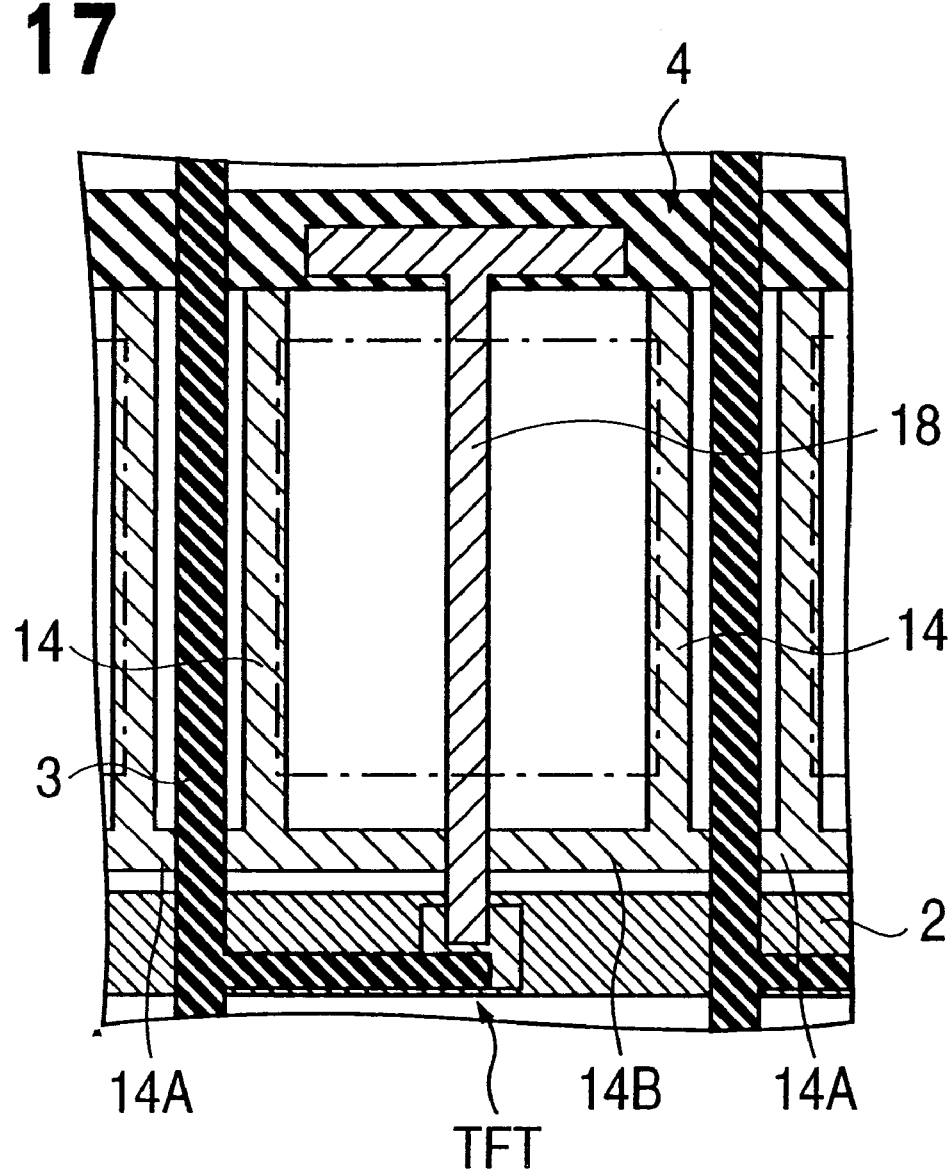
FIG. 17 is a plan view showing further another embodiment of the liquid crystal display device according to the present invention.

In FIG. 17 corresponding to FIG. 14, the components assigned with the same reference numerals as those of FIG. 14 have the same functions. The configuration of FIG. 17 differs from that of FIG. 14 in that the plural display electrodes 14 in each pixel region are electrically linked with each other at an end portion of each thereof via the conductor layer 14B on assumption that the conductor layer 14A is beforehand fabricated.

With the provision, the conductor layers 14A and 14B are electrically and physically connected to each other to resultantly configure a conductor layer arranged in parallel with and in the vicinity of the scan signal line 2. The conductor layer accordingly conducts a function similar to that of the reference signal line 4.

In the structure above, there is attained an advantageous effect as that of embodiment 7. However, when the electric linkage is absent between the reference signal lines 4 and the video signal line 3, namely, when the configuration is in the normal state without any defect, the conductor layers 14A and 14B function in a manner similar to that of the reference signal line 4. Consequently, the combined resistance value of the reference signal lines 4 can be minimized and hence it is possible to prevent a so-called horizontal smear caused by a waveform distortion on the reference signal line.

The term "horizontal smear" in this description indicates a phenomenon taking place as follows. When a voltage waveform applied to an end of the reference electrode 4 is propagated to another end thereof, the waveform is distorted due to a large resistance value of the reference electrode 4, which appears as the discrepancy in luminance in an image displayed on the display.

Embodiment 9

Figure 18A:
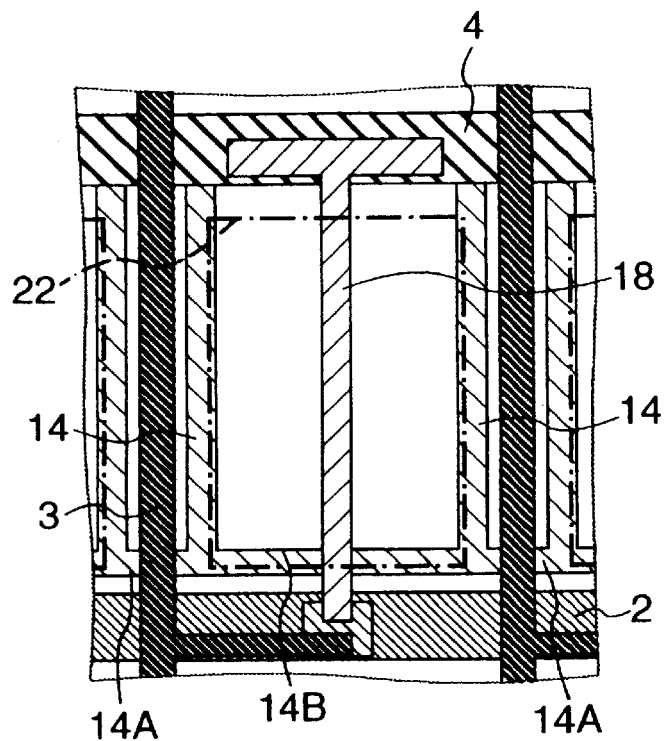
FIG. 18A is a plan view showing still another embodiment of the liquid crystal display device according to the present invention.

FIG. 18A corresponds to FIG. 17. In FIG. 18A, the constituent elements assigned with the same reference numerals as those of FIG. 17 perform the same functions. The structural difference between FIGS. 17 and 18A resides in that the configuration of FIG. 18A includes a different pattern of the light shielding film 22 for the lower substrate 1A. Moreover, in this construction, when the electric field is missing between the display and reference electrodes 18 and 14, light is prevented from passing from the transparent substrate 1A via the liquid crystal to the opposing transparent substrate 1B. Namely, the system is configured to operate in the normally black mode.

To establish the normally black mode, the rubbing directions respectively of the alignment films 20 and 25 disposed respectively on the sides of transparent substrates 1A and 1B are parallel to each other. Moreover, either one of the light transmission axes of the polarizer plates 21 and 26 arranged respectively on the ides of the substrates 1A and 1B respectively opposing to the liquid crystal sides thereof is parallel to the rubbing direction, and the remaining one of the light transmission axes is orthogonal thereto.

Figure 18B:
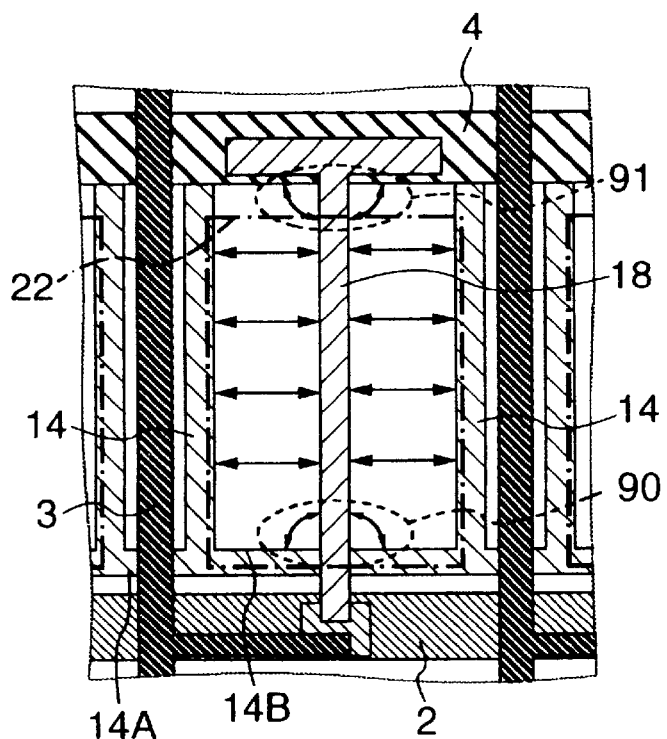
FIG. 18B is a schematic diagram showing an electric field distribution for explaining operation of the in-plane switching type liquid crystal display device.

FIG. 18B schematically shows the field distribution between the display electrode 18 and the reference electrodes 14, conductor layer 14B, and reference signal line 4 when the voltages are applied thereto. In this diagram, assume that a region in the vicinity of the display electrode 18 and reference signal line 4 is indicated by reference numeral 91 and a region in the proximity of the display electrode 18 and conductor layer 14B is denoted by numeral 90.

As can be seen from FIG. 18B, field vectors formed in the regions 90 and 91 are different from those generated between the display electrode 18 and the reference electrode 14.

In the normally white mode in which light passes from the transparent substrate 1A via the liquid crystal to the transparent substrate 1B when the voltages are applied to the system, even when a voltage is developed across the display electrode 18 and the reference electrode 14 to achieve the black image display, there occurs leakage of light due to domains in the regions 90 and 91 and hence light is transmitted therethrough. In consequence, the opening over the rectangular area of the light shielding layer 2 is required to be restricted. Namely, it is necessary that the opening is not related to the regions 90 and 91, and hence the ratio of opening is disadvantageously reduced.

In the normally black mode, on the other hand, since the black state is conducted when the voltages are not applied to the system, the domain is not produced in the regions 90 and 91 in this state and hence the leakage of light does not occur.

Therefore, the opening over the rectangular area of the light shielding layer 22 can be expanded to cover the regions 90 and 91.

Consequently, according to embodiment 9, the light shielding film 22 is arranged such that portions of the boundary line related to the opening are over the conductor layers 14A and 14B as shown in FIG. 18A, which leads to a substantial improvement of the ratio of opening.

Figure 19:
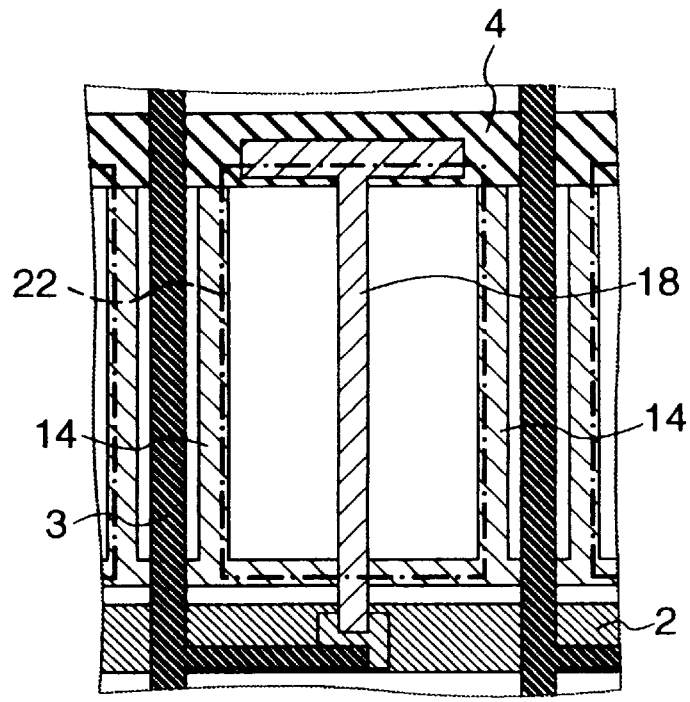
FIG. 19 is a plan view showing another embodiment of the liquid crystal display device according to the present invention.

FIG. 19 is a configuration diagram showing an embodiment implemented by further developing the concept above. A portion of the boundary line related to the opening are disposed also over the reference signal line 4, thereby improving the ratio of opening.

Embodiment 10

Figure 20:
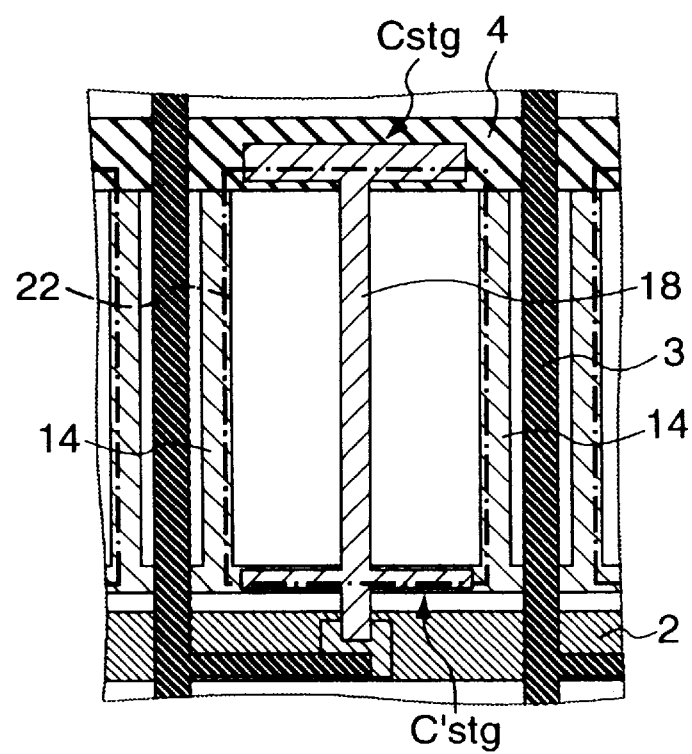
FIG. 20 is a plan view showing another embodiment of the liquid crystal display device according to the present invention.

FIG. 20 shows an example of constitution obtained by modifying the embodiment of FIG. 19. In FIG. 20, the constituent components having the same reference numerals as those of FIG. 19 have the same functions, respectively. The construction of FIG. 20 is different from that of FIG. 19 in that the display electrode 18 includes an extended portion over the conductor layer 14 via the dielectric layer 15, the conductor layer having a function similar to that of the reference signal line 4 to form a storage capacity C'stg in addition to the capacity Cstg over the reference signal line 4.

In the liquid crystal display device thus constructed, since a portion of the capacity inherent to the storage capacitor Cstg can be covered by the capacitor C'stg, the capacity of the capacitor Cstg is minimized. Thanks to this provision, the line width of the reference signal line 4 can be reduced and the ratio of opening can be further improved.

Embodiment 11

Figure 21:
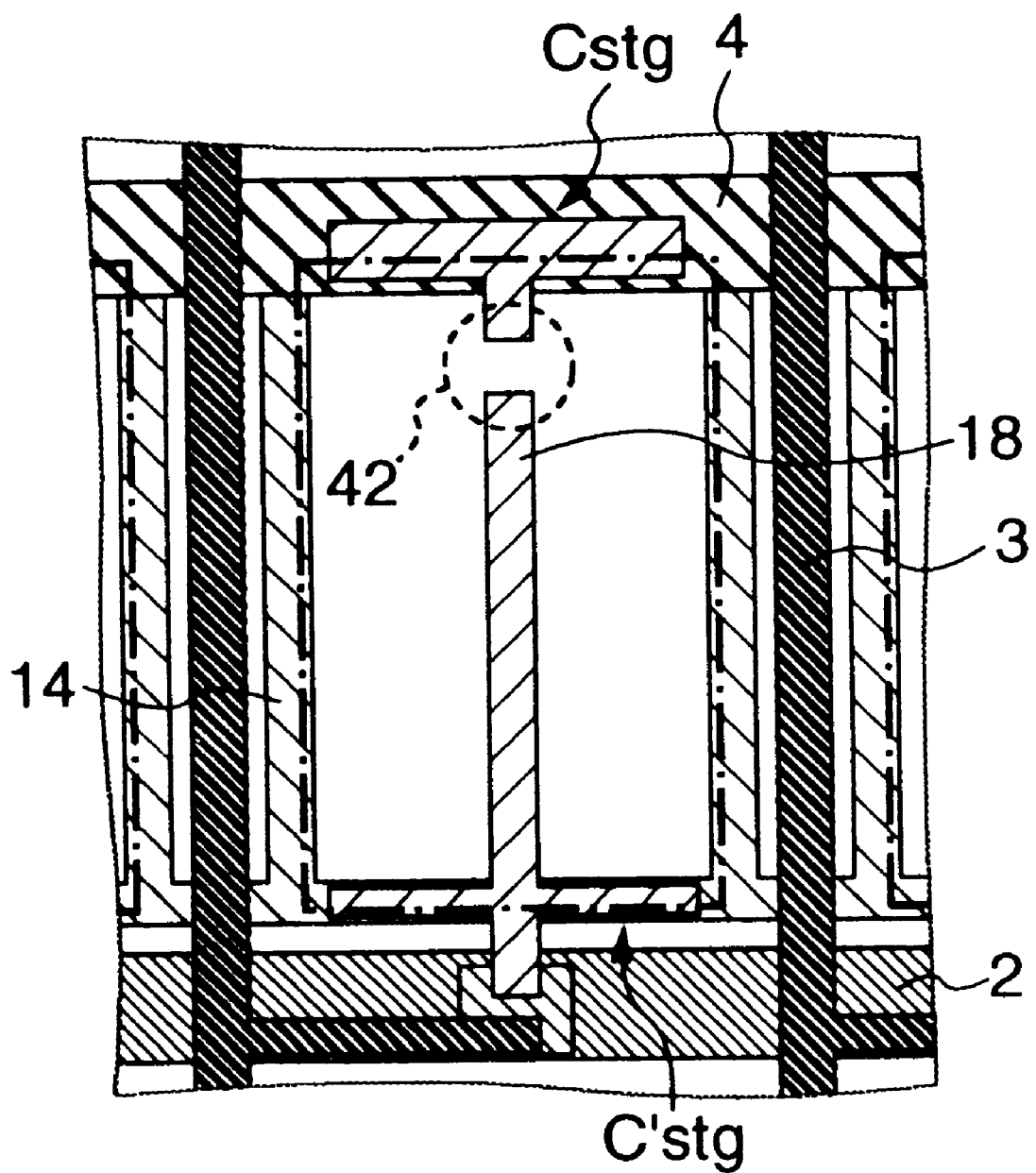
FIG. 21 is a plan view showing another embodiment of the liquid crystal display device according to the present invention.

FIG. 21 shows a modified example of the configuration of FIG. 20. In the liquid crystal display device configured as shown in FIG. 21, when a short-circuit or linkage is detected between the reference signal line 4 and a portion of the display electrode 18 in which the storage capacity Cstg is formed, the failure due to the electric linkage can be removed by disconnecting the display electrode 18 at a position in the vicinity of the capacitor Cstg, for example, by a laser beam. In this situation, since the display electrode 18 thus separated from the capacitor Cstg is still kept connected to the storage capacitor C'stg, the function of the electrode 18 is naturally guaranteed.

According to the embodiment, the construction shown in FIG. 20 is assumed to be employed. However, the advantageous effect of the embodiment can be also attained by applying the idea of the present invention to the configurations shown in FIGS. 17, 18A, and 18B.

In the embodiments of the liquid crystal display device described above, it is easily achieved to recover any electric linkage occurring between the reference signal line and the video signal line disposed with the insulator film therebetween to intersect the reference signal line.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A liquid crystal display device, comprising:

a first transparent substrate;

a second transparent substrate opposing to the first transparent substrate; a liquid crystal layer disposed between the first and second transparent substrates;

a plurality of scanning lines juxtaposed on the first transparent substrate in a first direction and extending along a second direction transverse to the first direction;

a plurality of reference signal lines juxtaposed on the first transparent substrate in the first direction and extending along the second direction; and a plurality of video signal lines juxtaposed on the first transparent substrate in the second direction and extending along the first direction;

pixel regions provided on surfaces of the substrates on the liquid crystal side;

each of the pixel regions including reference electrodes being connected to one of the plurality of reference signal lines and extending along the first direction, and a display electrode being disposed between the reference electrodes, wherein voltages are applied to the display and reference electrodes to generate an electric field in the liquid crystal layer to be substantially parallel to the transparent substrates by supplying a video signal to the display electrode via a switching element which is switched in response to a scanning signal supplied through one of the plurality of scanning signal lines and by supplying a reference signal through one of the plurality of reference signal lines;

wherein respective ones of the reference electrodes of adjacent pixel regions which are disposed adjacent to each other are commonly connected to the one of the plurality of reference signal lines and electrically linked to each other through a conductive layer which is spaced from the one of the plurality of reference signal lines.

2. A liquid crystal display device according to claim 1, wherein the conductive layer is extended so as to connect to each of the reference electrodes in the pixel region;

a portion of the display electrode being disposed over the one of the plurality of reference signal lines with an insulator film being interleaved therebetween;

another portion of the display electrode being disposed over the extended portion of the conductive layer with an insulator film being interleaved therebetween.

3. A liquid crystal display device according to claim 2, further including:

a light shielding film formed on a surface on the side of the liquid crystal layer of the second transparent substrate, the light shielding film having an opening for each of the pixel region;

a portion of a boundary of the opening of the light shielding film being aligned onto the extended portion of the conductive layer.

* * * * *